United States Patent [19]

Kimball

[11] Patent Number: 4,676,018
[45] Date of Patent: Jun. 30, 1987

[54] AUTOMATIC HOOK SETTER AND FISHING ROD HOLDER

[76] Inventor: Bud Kimball, 440 Sage St., P.O. Box 1151, Elko, Nev. 89801

[21] Appl. No.: 882,482

[22] Filed: Jul. 7, 1986

[51] Int. Cl.$^4$ .............................................. A01K 97/00
[52] U.S. Cl. ............................................ 43/15; 43/16
[58] Field of Search ....................................... 43/15, 16

[56] References Cited

U.S. PATENT DOCUMENTS

| 3,699,701 | 10/1972 | Jacobs | 43/15 |
| 3,977,117 | 8/1976 | Zahner | 43/15 |
| 4,040,197 | 8/1977 | Robbins | 43/15 |
| 4,235,035 | 11/1980 | Guthrie | 43/15 |
| 4,391,059 | 7/1983 | Cordova et al. | 43/16 X |

Primary Examiner—Nicholas P. Godici
Assistant Examiner—Carmine Cuda
Attorney, Agent, or Firm—M. Ralph Shaffer

[57] ABSTRACT

A holder device for fishing rods including a mount, a support secured to said mount, and a rod or pole handle holder pivotally secured to said support, the holder being spring biased relative to said support. A pivot mechanism includes an eccentrically mounted release pin which releasably retains the holder relative to the support. A line-responsive lever is engaged with the pivot mechanism for rotationally displacing the pivot mechanism, thus causing an upward snap of the support, in response to a tug on the fish line. The device is thus suitable for leaving a fishing pole unattended and yet condition the same to set a hook upon a fish strike occurring.

10 Claims, 5 Drawing Figures

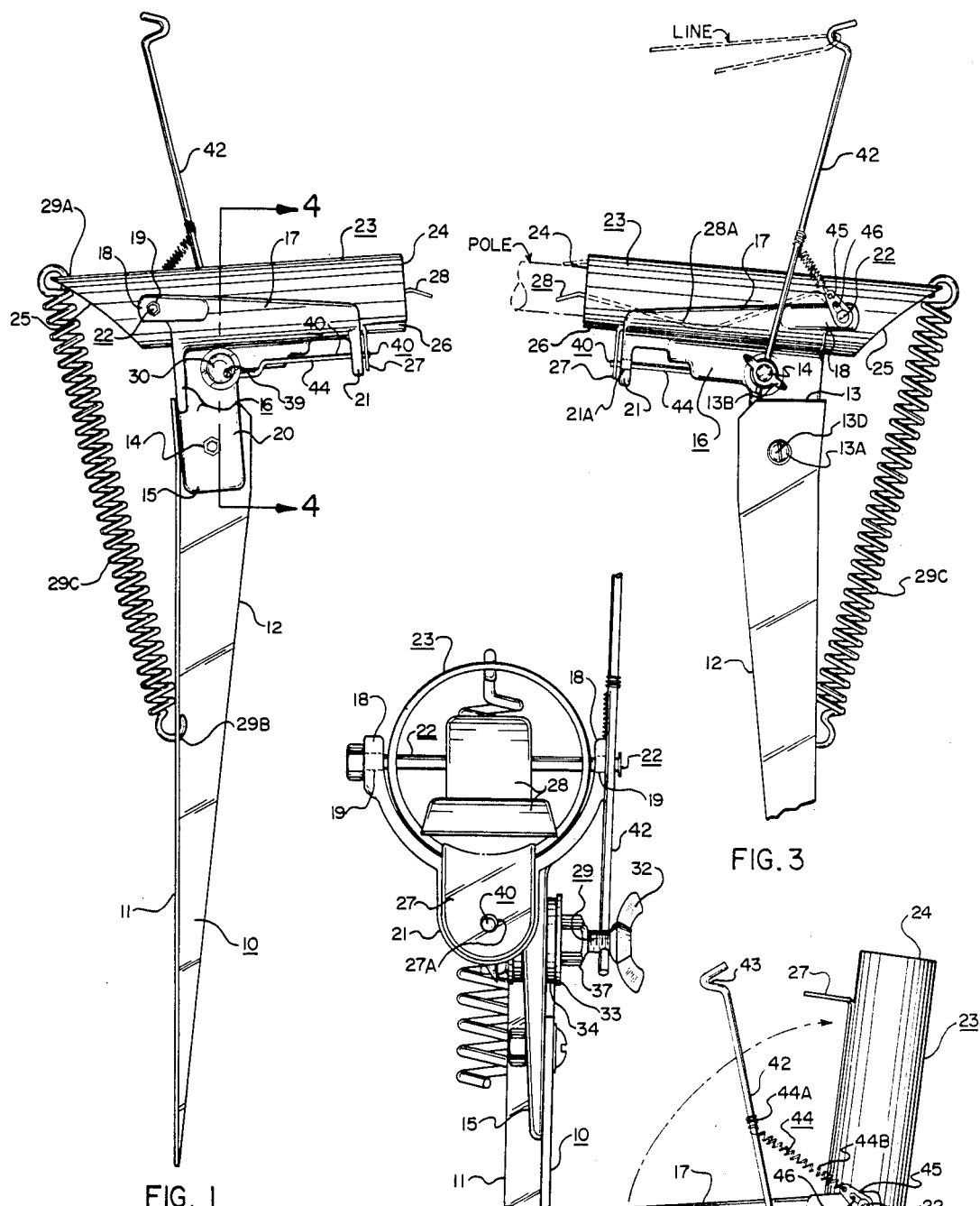

AUTOMATIC HOOK SETTER AND FISHING ROD HOLDER

FIELD OF INVENTION

The present invention relates to a holder or mount for a fishing rod and, more particularly, to fishing rod holders which are also capable of sensing a line jerk for automatically setting a fish hook when a fish strikes the line.

BRIEF DESCRIPTION OF PRIOR ART

Well known to fishermen is the problem of setting a fishhook at the correct moment. Particularly is this true where the fishermen desires to leave his pole unattended after casting, and even though reel drag has been suitably set. In both cases, provisions should be made such that the hook is jerked slightly forwardly upon the fish striking the bait and jerking the line initially rearwardly.

Several devices have been developed to automatically set a fish hook. U.S. Pat. Nos. 1,957,853, 2,964,868, 3,699,701, 3,837,109, 3,897,646, 3,973,346, 4,159,589, 4,235,035, 4,391,059, and 4,461,113 are known.

The above noted prior art is relevant to the present invention in their provision of many instances of certain types of devices that do jerk the pole when a strike is sensed. However, difficulties present themselves in prior art devices which necessitate complicated winding of the line and inappropriate pole pivoting action during a fish-strike interval. Finally, many of the prior art devices cannot easily be made or adapted for use with different sizes or types of fishing poles. Also inherent in known prior art devices is the lack of provision of adjustability relative to the release mechanism employed, and also the leverage and adjustability which would be desirable.

The present invention is believed to supply a need for simplified and yet very effective apparatus operating, upon sensing a line jerk as produced by a fish strike, to automatically set the fish hook, and which avoids difficulties above mentioned.

BRIEF SUMMARY OF THE INVENTION

The present invention presents a unique type of holder for fishing rods, which, in addition to supporting the rod, is useful for automatically setting a fish hook at times when fish strike the line; similarly, the subject fishing rod holder permits a fisherman to leave the rod unattended, and still be assured of the continuing capability of the rod, with the subject holder, for setting a fish hook should any fish strike the bait used.

The device includes a mount that is either capable of penetrating the ground or sand or, alternatively, which can be designed to be attached to a boat side, gunwale, or transom. A support is fixedly mounted to the mount and includes an upper portion shaped to cradle a pivoted pole handle holder. The latter is rearwardly pivoted and is constructed to receive a fishing-rod or pole handle. The holder itself includes a leafspring or other suitable device for constraining against axial rotation of the pole. Again, the support is secured to the mount, and the holder is pivoted to the support. Both support and holder have cooperating depending flanges separately provided with apertures that are selectively aligned. A pivot mechanism or means is provided in the support.

A tensioning spring is used to bias upwardly the pole handle holder relative to its support. To overcome the tensioning of the spring, the user simply presses down on the forward end of the holder such that its flange, particularly the aperture thereof, comes into alignment with the aperture of the depending flange of the holder support. A release pin engages the apertures but can be selectively withdrawn from the forward flange of the holder by an eccentric mechanism that is actuated by an adjustable rod or lever coacting with the line about which lever the line engages. Accordingly, a tug on a line will actuate the lever or rod such that an eccentric coupling automatically withdraws the pin from the forwardly positioned flange of the holder, thus allowing the tension spring to take over in jerking upwardly on the forward end of such holder, thus jerking rearwardly on the pole the handle of which is positioned within such holder. The lever employed is made adjustable such that the line-engaging portion thereof is selectively adjustable from the pivot point. Additionally, a secondary spring is disposed between the support and the lever such as to provide an adjustable tensioning effect as between the lever and the mount portion of the support, thereby selectively increasing or decreasing the biasing effect relative to the spring as to the lever, and thus permitting adjustment of the biasing point of the trip mechanism which comprises the release pin.

OBJECTS

It is therefore a general object of the present invention to provide an improved holder for fishing rods, which holder is provided with a suitable mechanism, whether the pole be attended or unattended, of snapping back on a fishing rod contained in the holder when a fish strikes the line, such holder and mechanism circumventing problems in prior devices.

It is an additional object to provide, in a fishing rod holder, a mechanism whereby the trip action is made adjustable.

An additional object is to provide a lever actuated trip mechanism for a fishing rod holder, and also a combination of the two wherein lever action is made adjustable both as to lever arm length and/or spring biasing action relative to the lever.

It is an additional object to provide a rod holder of the type described, a suitable mechanism which will deter the inadvertent axial rotation of a pole contained in the holder.

A further object is to provide a fishing rod holder wherein the spring-biased pole-handle holder of the device if provided with a lever-actuated release pin mechanism that is operated by suitable eccentric structure, the lever selectively being supplied adjustable features as to lever bias and lever arm length.

Another general object of the present invention is to provide an improved fishing rod holder which is capable of quickly pivoting or snapping a fishing rod in order to set a fish hook, which device overcomes the various problems encountered in prior art devices of the same general type.

A further object of the present invention is to provide a fishing rod holder which employs a release mechanism capable of being adjusted as to the amount of tension needed to actuate the mechanism, so that it can be used under a wide variety of conditions.

It is a related object of the present invention to provide a device with a trigger mechanism containing both a tension adjustment and an adjustment for the distance the fishing line must travel in order to cause the trigger to operate.

It is also an object of the present invention to provide a fishing rod holder which is capable of holding most types of fishing poles and which allows such poles to be easily placed in and removed from the device.

Another object of the present invention is to provide a fishing rod holder which allows a fisherman to leave a fishing pole unattended and/or to fish with multiple fishing poles.

A further object of the present invention is to provide a fishing rod holder which when actuated pivots the rod quickly and with sufficient leverage to solidly set a fish hook.

These and certain other objects and advantages of the invention will become apparent upon study of the following detailed description and appended claims, taken in conjunction with the accompanying drawings in which:

BRIEF DESCRIPTION OF DRAWINGS

FIG. 1 is a side elevation of the left side of the device of the present invention in cocked position.

FIG. 2 is a front view of the device of FIG. 1.

FIG. 3 is a side elevation of the right side of FIG. 1; FIGS. 2 and 3 are in fragmentary form.

FIG. 4 is an enlarged section of the pivot structure of FIG. 1 and is taken along the line 4—4 in FIG. 1.

FIG. 5 is similar to FIG. 1 but illustrates the uncocking and release of the pole handle holder relative to its cradle upon lever actuation by the line.

DETAILED DESCRIPTION OF PREFERRED COMPONENTS

In FIGS. 1-3, the device of the present invention is shown cocked. The components of the device include a mount 10 having joined flanges 11 and 12 and upper portion 13. Aperture 13A is provided for securement attachments 13D. Thus, mount 10 will be secured at 14 to the lower portion 15 of support 16. Support 16 includes a cradle 17 provided with opposite rearward ears 18 serving as attachment ears and which have aligned apertures 19. Depending portion 20 will, of course, be secured by attachment 13D to mount 10 at aperture 13A.

It is important to note that depending flange 21 is forwardly supplied on the cradle 17 and which includes an aperture 21A accommodating release pin placement. Pivoted by pivot attachments 22 to the rearwardly extending ears 18 of support 16 is a pole handle holder 23. Pivot attachments 22 thereof incorporates a leaf-spring 28, extending to the forward end 24 of the holder 23, and which includes a convex-downward portion 28A for pressing against the pole handle to keep the same from inadvertently axial rotation. Holder 23 includes a slanted rearward end 25 and has a lower forward slot 26 formed from the downward bending of forward flange 27. Forward flange 27 has an aperture 27A which is in alignment with aperture 21A when the holder is positioned down completely inside the cradle 17 and the device is in cocked position. Apertures 29A and 29B will be provided to accommodate a tensioning spring 29C which serves to pull the rear-end of holder 23 rapidly downwardly once the release pin is withdrawn from forward flange 27A in a manner hereinafter described.

The release pin mechanism 29 includes a bolt 29 such as a stove bolt which has head 30. The head is integral with shank 31, the latter being provided with wingnut 32. An adjustment nut 37 is supplied on the shank 31 in the manner indicated for adjusting frictional drag relative to rotational movement of the pivot means. Likewise mounted on shank 31 are a pair of rubber washers 35 and 36 and also metal washers 33 and 34, as indicated, to supply such drag. Head 30 includes an eccentrically-positioned hole 38 that receives the bent retainer end 39 of release pin 40, the latter being provided with shank 44. It is release pin 40 that proceeds through the aligned apertures 21A and 27A when the device is cocked. Shank 31 has an aperture 37 that receives rod or lever 42 having line engaging loop 43. A spring 44 has a first portion 44A attached to the lever and a second portion 44B secured to a link 45 having slot type hole 46 within which pin 22 is placed.

In operation, the structure is cocked by the user pressing down on the forward end 24 of holder 23 such that apertures 21A and 27A come into alignment, at which point the forward end of release pin 40 will engage not only aperture 21A, through which it is permanently positioned, but also this time proceeds forwardly to engage the flange 27 at its aperture 27A. This engagement is produced by the counterclockwise or forward positioning of the holder 23 seen in FIG. 3, the notch or loop at 43 in lever 42 being available to receive the fish-line looped thereover as shown. A sliding friction fit will be enjoyed as between the lever or rod 42 and aperture 37 so that the rod can be adjusted up and down in accordance with the lever arm desired as between loop 43 and the pivot point of bolt 29. Adjustment of the lever arm will not only affect, selectively, the tripping of the mechanism in accordance with pulls on the line but may be adjusted to compensate for wave and water-ripple effects. Similarly, the spring 44, in its up-and-down adjustment, at 44A, upon the lever or rod 42, will accomplish a variable biasing effect so as to adjust the lever for anticipated pulls on the line, depending upon what type of fishing is being done, i.e., for what fish.

Release of the trip-lever mechanism is accomplished when the lever arm is pulled forwardly, as by a tug on the line, such that the end 40A of release pin will be withdrawn from aperture 27A in flange 27 of holder 23. Once this occurs, the spring action of spring 29C takes over to jerk the forward end of the holder upwardly and thus set the hook on the line. The eccentric positionment of the bent end of the release pin at 39 moves the pin rearwardly and subsequently forwardly by virtue of pivoting of bolt 29 as is effected through pivotal displacement of the lever about the axis of the stove bolt.

It is thus seen that the eccentric mechanism including the release pin and lever are such that a wide variety of operating conditions can be accommodated for, this by adjustment of the lever and also adjustment of the spring 44, at 44A and 44B.

If desired, the mount can be configured for easy attachment to the gunwale, sides or transon of a boat; optionally, the mount is pointed, as shown at its lowermost end for insertion into sand or dirt along a seashore or lake bed.

While particular embodiments of the present invention have been shown and described, it will be obvious to those skilled in the art that various changes and modifications may be made without departing from the essential aspects of the invention, and the claims as set forth hereinafter, and in their equivalents, define the embodiments which fall within the true spirit and scope of the invention.

I claim:

1. A device for holding the handle end of a fishing rod, having fishing line, while awaiting a fish strike as to said line, said device including:
holder means including a forward end for receiving and holding the handle end of a fishing rod;
support means rearwardly pivotally mounting said holder means for movement in a vertical plane, said holder means and support means each having depending, selectively aligned flanges respectively provided with selectively aligned pin apertures;
pivot structure carried by said support means;
a release pin eccentrically connected to said pivot structure, passing through said support means flange pin aperture, and selectively passing through said holder means flange pin aperture;
an elongate rod means, having a line receiving portion, laterally and adjustably connected to said pivot structure for adjustably rotationally displacing said pivot structure about its own axis, whereby to move said release pin selectively into and out of engagement with said holder flange at said flange pin aperture;
and spring means coupled to and between said holder means and said support means for abruptly pulling upwardly said forward end of said holder means in response to withdrawal of said release pin from said flange aperture of said holder means.

2. The combination of claim 1 wherein said holder means includes interior spring retainer means for deterring axial rotational displacement of a fishing pole handle contained in said holder means.

3. The combination of claim 1 wherein said pivot structure comprises a bolt having a head and a shank, said head having an eccentric aperture receiving said release pin, said shank having a diametrical aperture slideably receiving said rod means.

4. The combination of claim 1 wherein said pivot structure includes washer means on opposite sides of said support means, and first nut means backing a respective one of said washer means for frictionally adjusting rotation-ability of said pivot structure relative to said support means.

5. The combination of claim 1 wherein said release pin has a laterally bent rearward end, said pivot structure including a head having an eccentrically disposed aperture receiving said forward end.

6. The combination of claim 1 wherein said pivot structure has a shank, said rod means being longitudinally adjustably mounted relative to said shank.

7. The combination of claim 1 wherein said rod means includes spring means coupled to said support means for rearwardly biasing said rod means.

8. The combination of claim 6 wherein said spring means at least partially encircles and is adjustable upon said rod means.

9. A device for holding the handle end of a fishing rod, having fishing line, while awaiting a fish strike as to said line, said device including:
holder means, having a forward end, for receiving and holding the handle end of a fishing rod;
support means rearwardly pivotally mounting said holder means for movement in a vertical plane, said holder means and support means each having depending, selectively aligned flanges respectively provided with selectively aligned pin apertures;
pivot structure carried by said support means;
a release pin of L-configuration eccentrically connected to said pivot structure, passing through said support means flange pin aperture, and selectively passing through said holder means flange pin aperture;
an elongate rod means, having a line receiving portion, laterally and adjustably connected to said pivot structure for adjustably rotationally displacing said pivot structure about its own axis, whereby to move said release pin selectively into and out of engagement with said holder flange at said flange pin aperture;
and spring means coupled to and between said holder means and said support means for abruptly pulling upwardly said forward end of said holder means in response to withdrawal of said release pin from said flange aperture of said holder means.

10. A device for holding the handle end of a fishing rod, having fishing line, while awaiting a fish strike as to said line, said device including:
holder means for receiving and holding the handle end of a fishing rod;
support means rearwardly pivotally mounting said holder means for movement in a vertical plane, said holder means and support means each having depending, selectively aligned flanges respectively provided with selectively aligned pin apertures
pivot structure carried by said support means and constructed for varying pivotal drag;
a release pin of L-configurement eccentrically connected to said pivot structure, passing through said support means flange pin aperture, and selectively passing through said holder means flange pin aperture;
an elongate rod means, having a line-receiving indented portion, laterally and adjustably connected to said pivot structure for adjustably rotationally displacing said pivot structure about its own axis, whereby to move said release pin selectively into and out of engagement with said holder flange at said flange pin aperture;
and spring means coupled to and between said holder means and said support means, rearwardly thereof, for abruptly pulling upwardly a forward end of said holder means in response to withdrawal of said release pin from said flange aperture of said holder means.

* * * * *